United States Patent
Tanaka et al.

(10) Patent No.: US 10,110,097 B2
(45) Date of Patent: Oct. 23, 2018

(54) ALTERNATING-CURRENT GENERATOR, VOLTAGE REGULATION DEVICE FOR ALTERNATING-CURRENT GENERATOR, AND MANUFACTURING METHODS THEREFOR

(71) Applicant: Mitsubishi Electric Corporation, Tokyo (JP)

(72) Inventors: Kazunori Tanaka, Tokyo (JP); Kenta Ninomiya, Tokyo (JP); Katsuya Akamatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 396 days.

(21) Appl. No.: 14/778,915

(22) PCT Filed: Jun. 11, 2013

(86) PCT No.: PCT/JP2013/066028
§ 371 (c)(1),
(2) Date: Sep. 21, 2015

(87) PCT Pub. No.: WO2014/199438
PCT Pub. Date: Dec. 18, 2014

(65) Prior Publication Data
US 2016/0049850 A1    Feb. 18, 2016

(51) Int. Cl.
*H02K 11/00* (2016.01)
*H02K 11/04* (2016.01)
(Continued)

(52) U.S. Cl.
CPC .......... *H02K 11/046* (2013.01); *H02K 15/00* (2013.01); *H02K 15/12* (2013.01); *H02K 19/365* (2013.01); *H02K 5/225* (2013.01); *H02K 2213/12* (2013.01)

(58) Field of Classification Search
CPC .......................... H02K 11/046; H02K 11/048
(Continued)

(56) References Cited

U.S. PATENT DOCUMENTS

2004/0155540 A1    8/2004   Nakamura et al.
2006/0096400 A1    5/2006   Shinmura et al.
(Continued)

FOREIGN PATENT DOCUMENTS

JP    2000-201417 A    7/2000
JP    2000-324750 A    11/2000
(Continued)

OTHER PUBLICATIONS

Communication dated Nov. 24, 2015 from the Japanese Patent Office in counterpart application No. 2015-522286.
(Continued)

*Primary Examiner* — Thomas Truong
(74) *Attorney, Agent, or Firm* — Sughrue Mion, PLLC; Richard C. Turner

(57) ABSTRACT

To provide an AC generator equipped with a voltage regulation device capable of cost reduction in terms of both of manufacture and device, a voltage regulation device for the AC generator, and a method for manufacturing the same. In an AC generator equipped with a voltage regulation device 16 for regulating the magnitude of output voltage, the voltage regulation device 16 is composed of: a molded body 15 having a plurality of insert conductors; and a circuit component 14 mounted on the molded body 15 and electrically connected to the insert conductors, and in the voltage regulation device 16, an extended-portion-for-jumper 19*ae* is integrally provided in a part of the insert conductor 19*a*.

4 Claims, 7 Drawing Sheets

(51) Int. Cl.
*H02K 19/36* (2006.01)
*H02K 15/12* (2006.01)
*H02K 15/00* (2006.01)
*H02K 5/22* (2006.01)

(58) Field of Classification Search
USPC ................................................... 310/68 D
See application file for complete search history.

(56) References Cited

U.S. PATENT DOCUMENTS

| | | | |
|---|---|---|---|
| 2007/0102931 A1* | 5/2007 | Oohashi | H02K 5/141 |
| | | | 290/30 R |
| 2007/0176501 A1* | 8/2007 | Nishimura | H02K 11/024 |
| | | | 310/68 R |
| 2007/0206363 A1 | 9/2007 | Cespedes et al. | |
| 2014/0042843 A1 | 2/2014 | Tanaka | |

FOREIGN PATENT DOCUMENTS

| | | |
|---|---|---|
| JP | 2004-166320 A | 6/2004 |
| JP | 2010-259209 A | 11/2010 |
| JP | 2012-191792 A | 10/2012 |
| JP | 2014-036527 A | 2/2014 |

OTHER PUBLICATIONS

Communication dated May 27, 2017, from the State Intellectual Property Office of People's Republic of China in counterpart Application No. 201380077318.3.
International Search Report of PCT/JP2013/066028 dated Jul. 23, 2013.
Communication dated Jan. 3, 2017 from the European Patent Office in counterpart Application No. 13886692.6.
Communication dated Jan. 22, 2018, from State Intellectual Property Office of the P.R.C. in counterpart application No. 201380077318.3.

* cited by examiner (a)

(b)

(a)

(b)

(a)

(b)

ately connected to a molded body afterwards, in order to realize common use in either case where there is or is not a part where the small component is to be connected in series to a circuit, a jumper which is well known may be provided afterwards as a replacement component for the small component, to realize a desired configuration.

ALTERNATING-CURRENT GENERATOR, VOLTAGE REGULATION DEVICE FOR ALTERNATING-CURRENT GENERATOR, AND MANUFACTURING METHODS THEREFOR

CROSS REFERENCE TO RELATED APPLICATIONS

This is a National Stage of International Application No. PCT/JP2013/066028 filed Jun. 11, 2013, the contents of which are incorporated herein by reference in its entirety.

TECHNICAL FIELD

The present invention relates to AC generators to be mounted in vehicles, for example, and voltage regulation devices to be used in AC generators, and methods for manufacturing the same.

BACKGROUND ART

A voltage regulation device (regulator) formed as a component of a conventional AC generator includes: a molded body in which a plurality of terminals being insert conductors are molded; a voltage regulation device main body disposed on one face side of the molded body and electrically connected to the terminals; a capacitor body; a resistor; and the like.

Of the terminal inserted in the molded body, other than a connector terminal exposed in an integrally provided connector and a grounding part, a portion irrelevant to welding is basically molded, and a welding portion is exposed (see Patent Document 1, for example).

Similarly to the above, another example employs a one-chip type regulator, in which a capacitance; an inductor; a negative surge absorbing diode and a positive surge absorbing Zener diode; or the like for EMI countermeasures, which are semiconductor components considered to be unsuitable to be mounted inside the one-chip, is mounted afterwards to an intermediate terminal (see Patent Document 2, for example).

Such a configuration can adapt to a wide variety of configurations that individually satisfy clients' requests, and needs only one type of one-chip IC regulator package. This allows easy cost reduction due to mass production effect, and construction of a control device that is inexpensive and highly reliable.

Meanwhile, the following feeding means provided in a power motor is disclosed. In the feeding means, either one of a first terminal and a second terminal which are to be respectively mounted to a resin base part and a connector part in a later step has a connection piece extending therefrom. This configuration eliminates use of a jumper which is separately provided so as to connect the first terminal, and the second terminal (see Patent Document 3, for example).

CITATION LIST

Patent Document

Patent Document 1: Japanese Patent Application No. 2012-177336, Specification and Drawings
Patent Document 2: Japanese Laid-Open Patent Publication No. 2010-259209
Patent Document 3: Japanese Laid-Open Patent Publication No. 2012-191792

SUMMARY OF THE INVENTION

Problems to be Solved by the Invention

The recent globalization is influencing marketing of vehicle AC generators as well as production thereof. Not only cost reduction regarding components, but also reduction of costs regarding manufacturing methods therefor, and costs for production devices are also being required.

Voltage regulation devices, which are one type of such components, have different specifications depending on the vehicles to which they are to be mounted. However, in some cases, even if the voltage regulation device cannot be used in common as an assembly, the voltage regulation device is sectioned so as to allow parts thereof to be used in common, thereby to reduce costs as much as possible.

For example, as in the voltage regulation device disclosed in Patent Document 1, in the case where a small component such as a capacitor body or a resistance is electric- For example, in the case of Patent Document 2, depending on the presence/absence of a noise removing inductor to be mounted in series shown in FIG. 13 and FIG. 14 of Patent Document 2, the inductor or a jumper is mounted afterwards in a space in the mold of a common intermediate terminal.

In the above case, the intermediate terminal can be used in common. However, when trying to use in common jigs and steps for holding and fixing separate components for forming circuits, manufacturing steps are actually added, and production equipment and production time are not readily reduced.

In addition, use of jumpers also prevents easy reduction of the number of components, easy improvement of workability, and easy improvement of productivity.

An alternative for eliminating use of jumpers is the one disclosed in Patent Document 3. However, in this configuration, the jumper is exposed from the mold, including the extended connection piece, the jumper connection part, and the wirings connecting these components. The jumper is merely snap-fitted to an engagement claw integrally formed in the resin base part.

As shown in FIG. 11 of Patent Document 3, the connector unit employs manufacturing steps of sequentially mounting terminals with one-side ends aligned. Thus, the work costs are not likely to be reduced.

In view of the above problems, an object of the present invention is to provide an AC generator equipped with a voltage regulation device capable of cost reduction in terms of both of manufacture and device, a voltage regulation device for the AC generator, and a method for manufacturing the same.

Solution to the Problems

An AC generator according to the present invention is an AC generator including: a stator; a rotor for inducing AC electromotive force to the stator by being driven to rotate; a rectification device for converting the AC electromotive force into DC output voltage; and a voltage regulation device for regulating the magnitude of the output voltage, wherein the voltage regulation device is composed of: a molded body having a plurality of insert conductors; and a circuit component mounted to the molded body and electrically connected to the insert conductors, and an extended-portion-for-jumper is integrally provided in a part of the insert conductors.

A method for manufacturing an AC generator according to the present invention is a method for manufacturing an AC generator including: a stator; a rotor for inducing AC electromotive force to the stator by being driven to rotate; a rectification device for converting the AC electromotive force into DC output voltage; and a voltage regulation device for regulating the magnitude of the output voltage, wherein the voltage regulation device is composed of: a molded body having a plurality of insert conductors; and a circuit component mounted to the molded body and electrically connected to the insert conductors, and an extended-portion-for-jumper is integrally provided in a part of the insert conductors, the method including: providing the extended-portion-for-jumper at a portion that corresponds to a portion where a circuit component is to be connected afterwards to another voltage regulation device that is compatible with the voltage regulation device; and providing electrical connection of the extended-portion-for-jumper by use of welding equipment identical to welding equipment that is used when a circuit component of the another voltage regulation device which is compatible with the voltage regulation device is to be connected afterwards.

Effect of the Invention

According to the AC generator of the present invention, it is possible to realize an AC generator equipped with a voltage regulation device capable of cost reduction in terms of both of manufacture and device. In addition, by replacing the insert conductor, it is possible to substantially adapt to a plurality of different circuits the number of which corresponds to the presence/absence of small components, e.g. a resistor, to be mounted in series afterwards to the voltage regulation device. Additional separate components for forming a circuit that does not have small components to be mounted in series are not required.

According to the method for manufacturing an AC generator of the present invention, it is possible to adapt to a plurality of different circuits the number of which corresponds to the presence/absence of small components, e.g. a resistor, to be mounted in series afterwards to the voltage regulation device, by use of identical welding equipment.

DESCRIPTION OF EMBODIMENTS

Embodiment 1

A vehicle AC generator according to Embodiment 1 of the present invention will be described with reference to the drawings.

Figure 1:
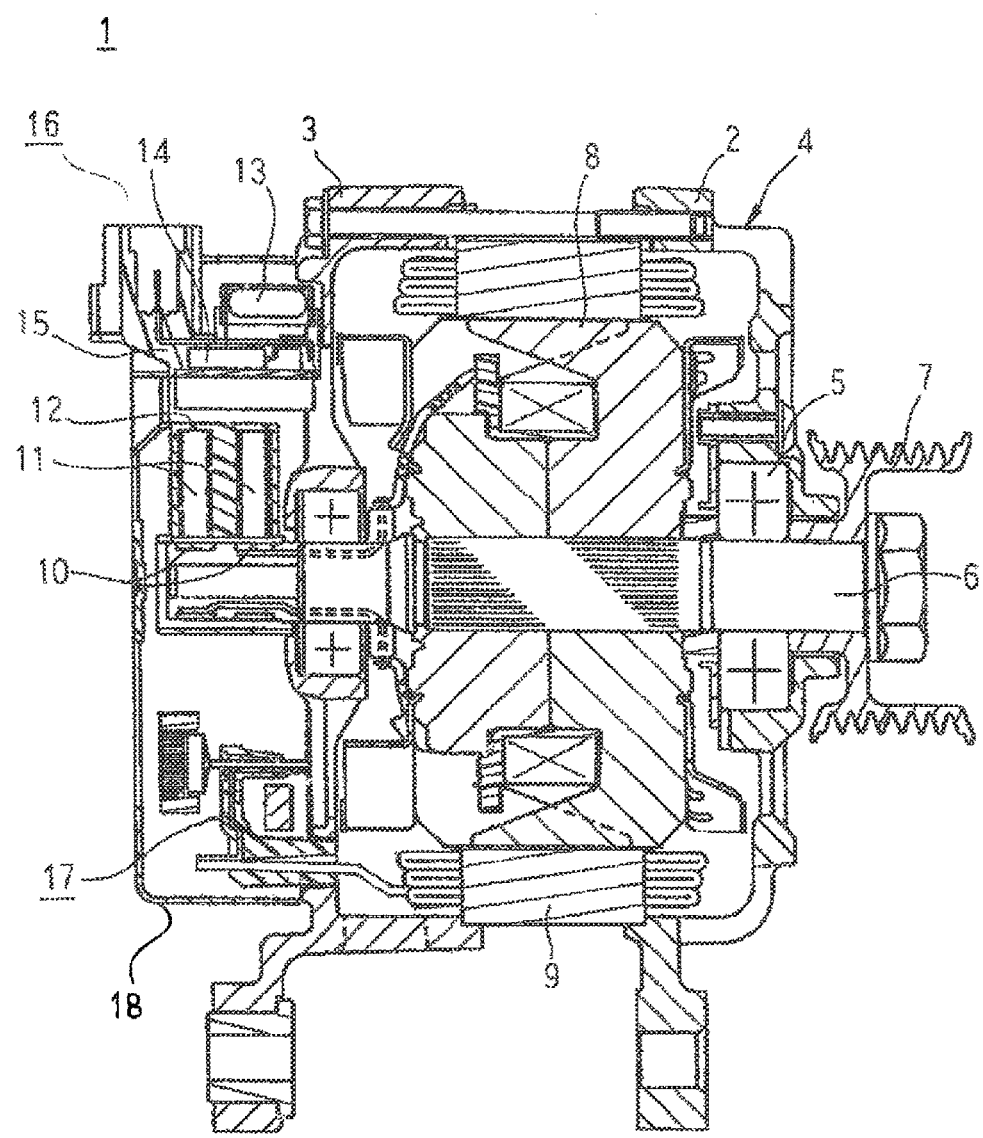
FIG. 1 is a side cross-sectional view showing a vehicle AC generator according to Embodiment 1 of the present invention.
Figure 2:
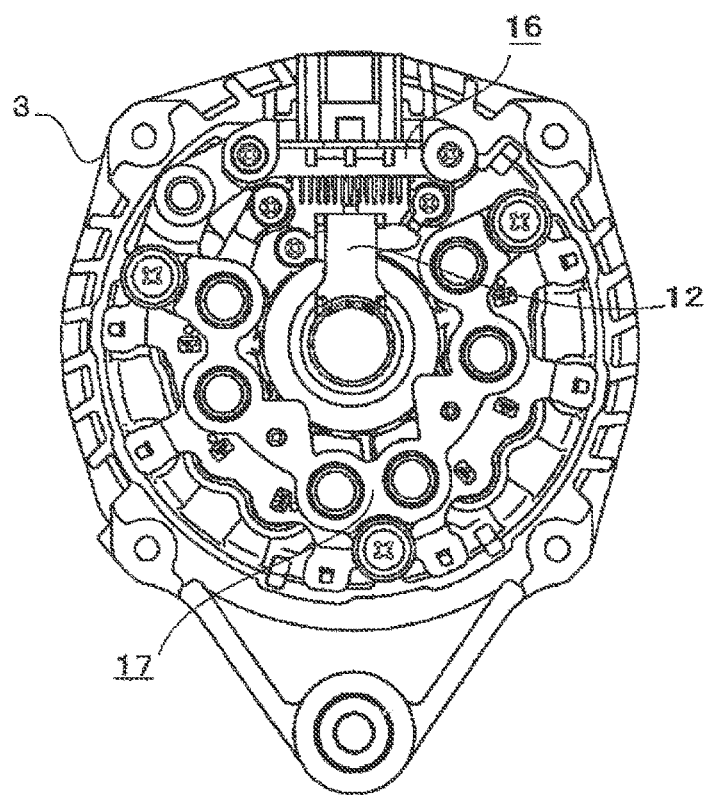
FIG. 2 is a back view of the vehicle AC generator shown in FIG. 1 without a protection cover.
Figure 3:
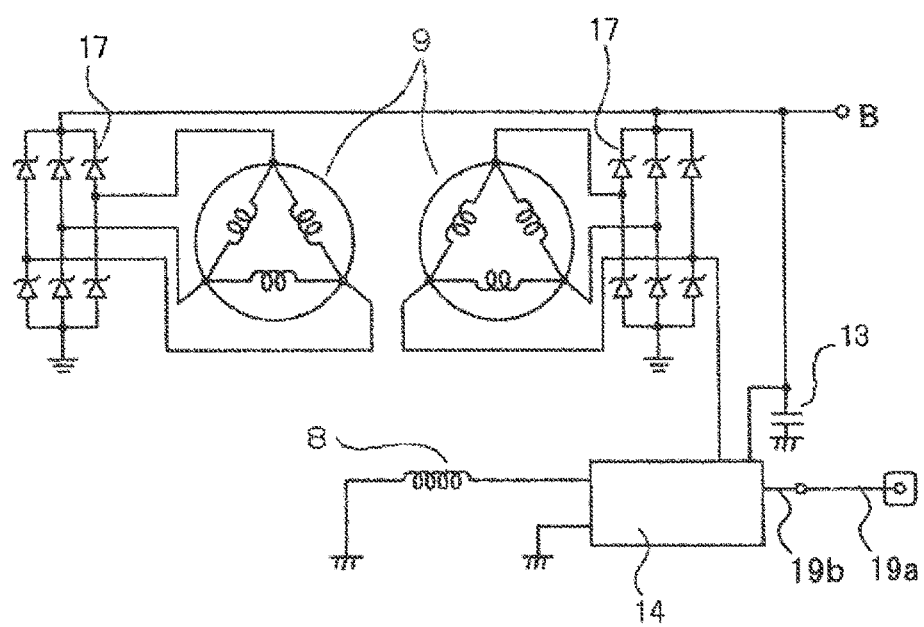
FIG. 3 is an electric circuit diagram of the vehicle AC generator shown in FIG. 1.

In FIGS. 1 to 3, a vehicle AC generator 1 includes: a casing 4 composed of a front bracket 2 and a rear bracket 3 each having a substantially bowl shape; a shaft 6 rotatably supported via a pair of bearings 5 by the casing 4; a pulley 7 fixed on the end of the shaft 6 extending out on the front side of the casing 4; a rotor 8 provided in the casing 4 and fixed on the shaft 6; a stator 9 fixed on the casing 4 so as to surround the rotor 8; a pair of slip rings 10 fitted on a portion of the shaft 6 extending out on the rear side of the casing 4; and a pair of brushes 11 sliding on the slip rings 10 and for supplying current to the rotor 8 from outside.

By the rotor 8 being driven to rotate in this configuration, AC electromotive force is induced in the stator 9.

The vehicle AC generator 1 also includes: a brush holder 12 housing these brushes 11; a voltage regulation device 16 which includes a capacitor body 13 provided on the outside diameter side of the brush holder 12 and having therein a capacitor element which absorbs noise occurring in the circuit, a circuit component 14 provided as a terminal or a general-purpose package, and a molded body 15, the voltage regulation device 16 being for regulating the magnitude of AC voltage occurring in the stator 9; a rectification device 17 formed in a substantially C shape and provided on the outer circumference side of the slip rings 10 in a fan shape around the shaft 6 on a plane orthogonal to the axis of the shaft 6, the rectification device 17 being for rectifying AC voltage occurring in the stator 9 into DC voltage; and a cover 18 mounted to the rear bracket 3 so as to cover the brush holder 12, the voltage regulation device 16, and the rectification device 17.

Figure 4:
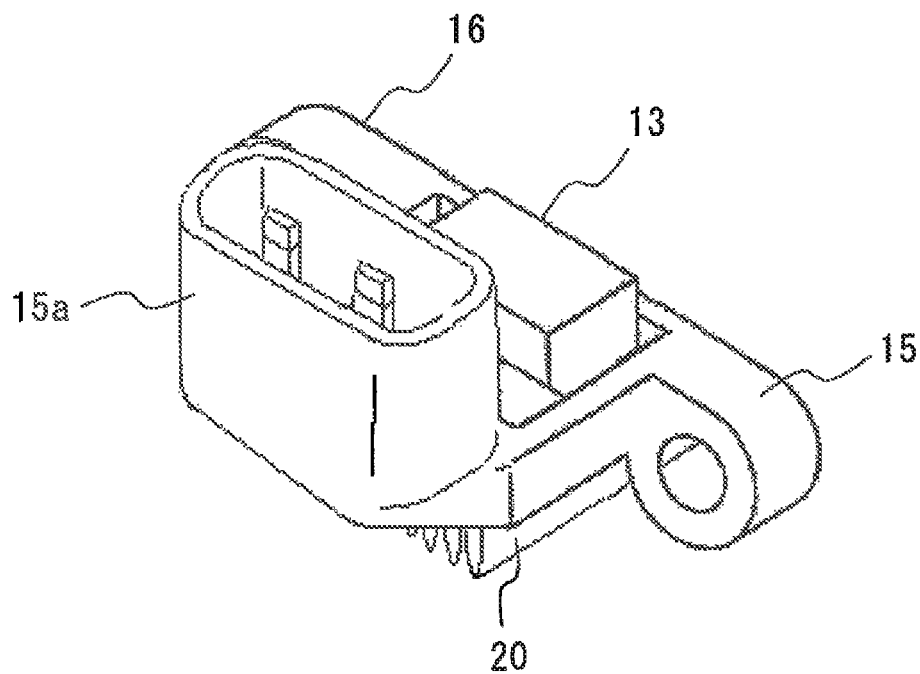
FIG. 4 is a perspective view showing the external view of the voltage regulation device shown in FIG. 1.
Figure 5:
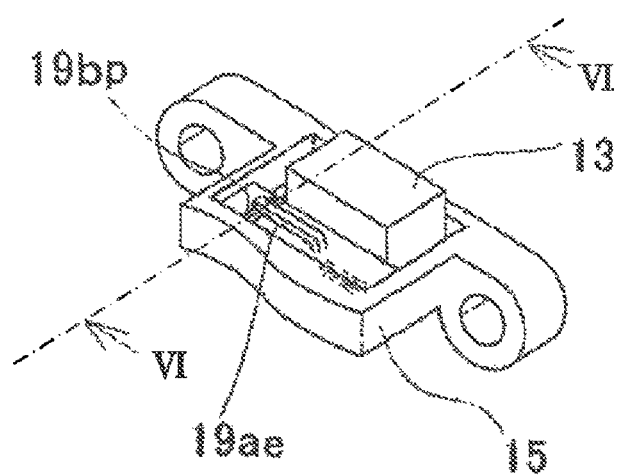
FIG. 5 is a perspective view showing a major part of the voltage regulation device shown in FIG. 4.
Figure 6:
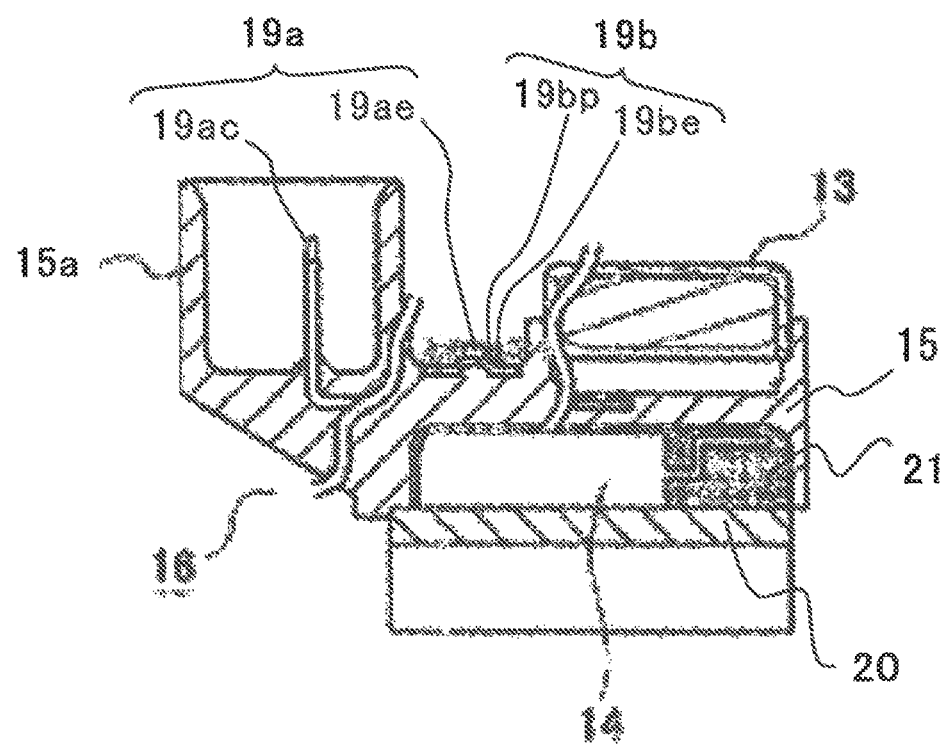
FIG. 6 is a VI-VI cross-sectional view of the voltage regulation device shown in FIG. 5.

As shown in FIGS. 4 to 6, the voltage regulation device 16 includes: the capacitor body 13 provided on the outside diameter side of the brush holder 12 and having therein a capacitor element which absorbs noise occurring in the circuit; the circuit component 14 provided as a terminal or a general-purpose package; and the molded body 15.

The molded body 15 of the voltage regulation device 16 is molded such that a plurality of insert conductors (only two insert conductors 19a, 19b are shown in the drawings) are exposed only at portions thereof where electrical connection is to be made. To predetermined exposed part, the circuit component 14 and the capacitor body 13 are connected through welding or the like in a later assembly step. The molded body 15 also has formed therein a connector 15a for providing connection to an external circuit.

FIG. 5 shows the molded body 15 with the connector 15a omitted so as to show the insert conductors 19a and 19b which are the major part of the present invention.

As shown in FIGS. 5 and 6, an extended-portion-for-jumper 19ae is provided integrally with the insert conductor 19a at a specific portion, of the two insert conductors 19a and 19b.

The extended-portion-for-jumper 19ae is a portion of the insert conductor 19a, and has a cantilever structure in which one end portion of the extended-portion-for-jumper 19ae extends to a position where the one end portion faces the other insert conductor 19b.

That is, the insert conductor 19a has the extended-portion-for-jumper 19ae of the cantilever structure on one hand, and a connector end 19ac exposed from the molded body 15 in the connector 15a on the other hand.

The other insert conductor 19b includes an exposed surface (=weld portion) 19be, which is an exposed portion of the insert conductor 19b.

On the exposed surface 19be, a protrusion 19bp for welding is formed in a substantially oblong shape on a plane.

In a state where the extended-portion-for-jumper 19ae of the insert conductor 19a overlaps the protrusion 19bp in a direction orthogonal to the longitudinal direction of the substantially oblong shape, the other portions than the exposed portions are embedded in the molding (FIG. 6).

As the overlapping state in this case, preferably, the upper surface of the protrusion 19bp and the lower surface of the extended-portion-for-jumper 19ae are overlapping each other in a state of "zero touch" (i.e., a contact state that does not cause compressive deformation), or a state of having a slight gap therebetween.

With respect to the extended-portion-for-jumper 19ae, the area necessary for welding is exposed from the molding, and its root portion is covered with the molding, whereby the cantilever structure is realized.

The extended-portion-for-jumper 19ae of the insert conductor 19a is provided at a portion that corresponds to a portion where a circuit component of a voltage regulation device is to be connected afterwards, the voltage regulation device having an identical shape to that of the voltage regulation device 16 and being compatible therewith.

Figure 9:
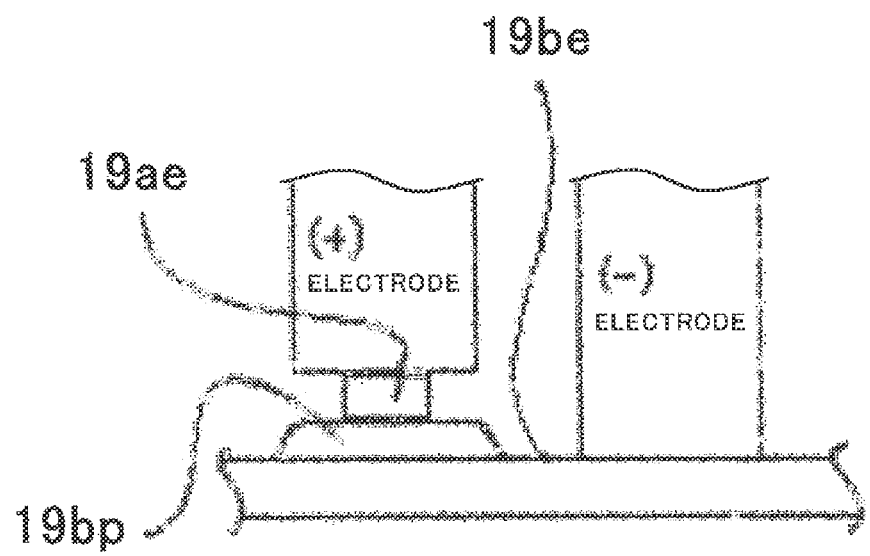
FIGS. 9(a) and 9(b) are respectively a view explaining how to weld the voltage regulation device shown in FIG. 5 and FIG. 8.
Figure 9:
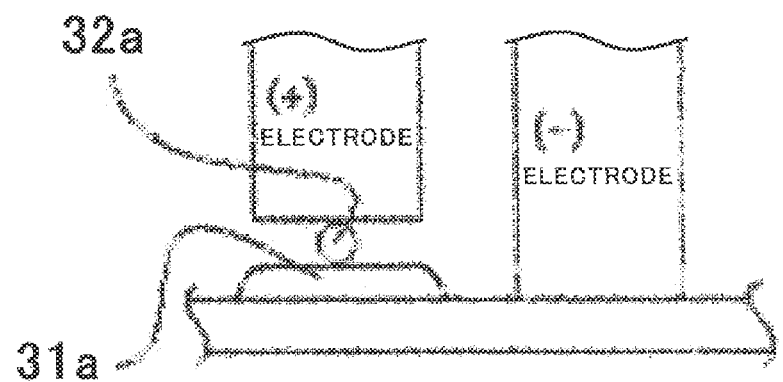

As shown in FIG. 9(a), in the portion where the protrusion 19bp of the insert conductor 19b and the extended-portion-for-jumper 19ae of the insert conductor 19a overlap each other, a (+) electrode is disposed on the upper surface of the extended-portion-for-jumper 19ae under a predetermined pressure, a (−) electrode is similarly disposed on one of the exposed surfaces formed by the insert conductor 19b including the exposed surface 19be, and a predetermined current is flowed between the electrodes, whereby indirect spot welding is performed.

After the welding step, using as a bottom face a cooling plate 20 attached to the circuit component 14 which has been mounted and welded to the rear surface side of the molded body 15, resin 21 is loaded so as to cover the insert terminal welded portion, whereby the voltage regulation device 16 is completed FIG. 6.

The completed voltage regulation device 16 is incorporated in the AC generator as shown in FIGS. 1 and 2, circuit connection is made as shown in FIG. 3, and the magnitude of output voltage of the rectification device 17 is regulated.

In the voltage regulation device 16 as described above, the extended-portion-for-jumper is provided to an insert conductor at a portion that corresponds to a portion where a circuit component is to be connected afterwards to a compatible voltage regulation device. Accordingly, it becomes possible to use the same welding step and welding equipment as used in manufacture of the compatible voltage regulation device.

Figure 7:
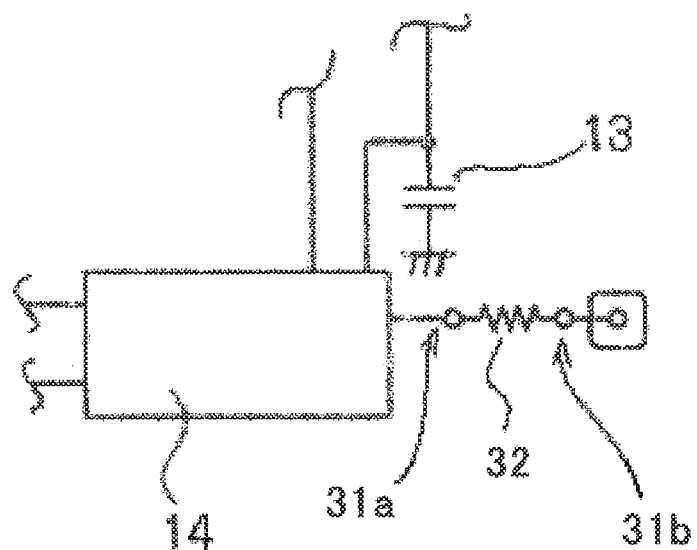
FIG. 7(a) is a major part electric circuit diagram showing a voltage regulation device to which a resistor is connected afterwards as an example of a compatible voltage regulation device.
FIG. 7(b) is a major part electric circuit diagram showing a conventional voltage regulation device using a jumper.
Figure 7:
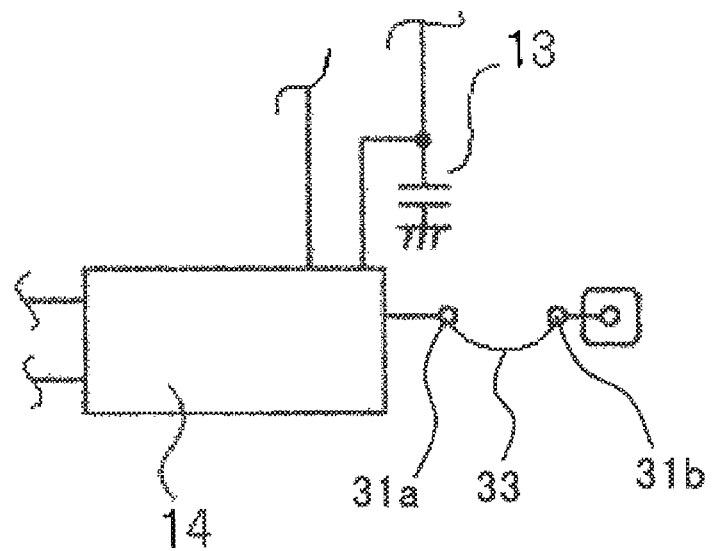
Figure 8:
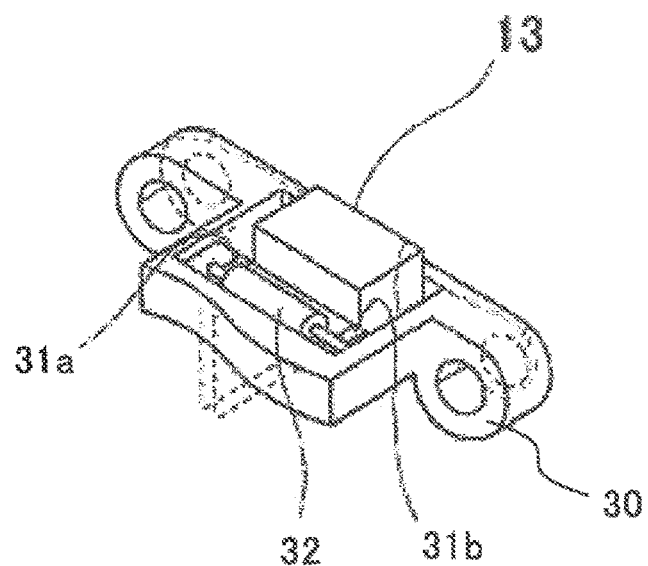
FIG. 8(a) is a major part perspective view showing a voltage regulation device to which a resistor is connected afterwards as an example of a compatible voltage regulation device.
FIG. 8(b) is a major part perspective view showing a conventional voltage regulation device using a jumper.
Figure 8:
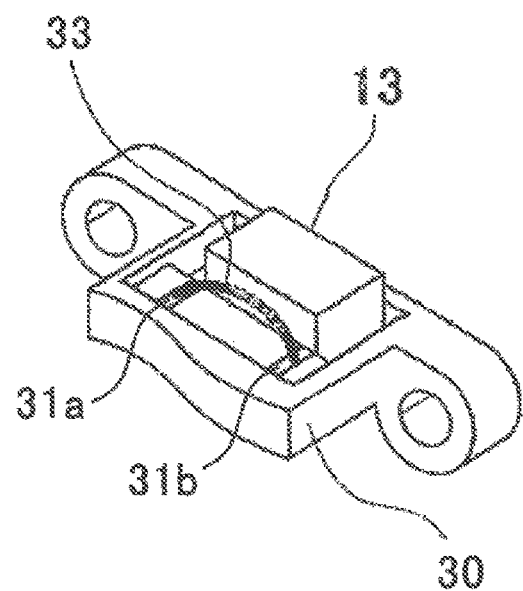

FIG. 7(a) and FIG. 8(a) are respectively a major part electric circuit diagram and a major part perspective view showing a voltage regulation device to which a resistor is connected afterwards as an example of a compatible voltage regulation device: FIG. 7(b) and FIG. 8(b) are respectively a major part electric circuit diagram and a major part perspective view showing a conventional voltage regulation device using a jumper.

For example, in a voltage regulation device which has an identical shape to that of the voltage regulation device 16 and is compatible therewith, and to which a circuit component is to be attached afterwards, in the case where a series resistor 32 is to be connected to insert conductors 31a and 31b of a molded body 30 as shown in FIG. 8(a) in order to realize circuit connection as shown in FIG. 7(a), indirect spot welding is simultaneously (or successively) is performed at resistor leads 32a at both ends of the series resistor 32 as shown in FIG. 9(b).

At this time, two pairs of the (+) and (−) electrodes are provided in the welding equipment, and only one pair is operated or the two pairs are simultaneously operated, thereby enabling adaptation to different circuit specifications with single welding equipment.

The common use of the welding equipment itself is also realized in the case of a conventional voltage regulation device to which a jumper 33 as a separate component is mounted afterwards as shown in FIG. 7(b) and FIG. 8(b).

However, in this case, the cost of the jumper itself is added, and the supply of the jumper, a chucking jig, and adjustment of the holding function and the like are required. Thus, complicated work cannot be eliminated, the costs are still high, and inexpensive mass production is hindered.

When the voltage regulation device 16 according to the present invention is used, by replacing the insert conductor 19a having the integrally-formed extended-portion-for-jumper 19ae, it is possible to substantially adapt to a plurality of different circuits the number of which corresponds to the presence/absence of small components, e.g. a resistor, to be mounted in series afterwards. Additional separate components for forming a circuit that does not have small components to be mounted in series are not required.

In the present invention, the configuration of the molded body 15 is not limited to the above-described configuration. The positions where the circuit component 14 and the capacitor body 13 are mounted are merely examples and various configurations can be employed.

In addition, the weld portions of the extended-portion-for-jumper and the resistor may not be formed by the so-called indirect spot welding method described above. Depending on the configuration of the molded body, a direct spot welding method may be employed.

Further, the extended-portion-for-jumper does not necessarily have the cantilever structure as long as the extended-portion-for-jumper can be connected as a conductor for a jumper.

It is noted that, within the scope of the present invention, the above embodiments may be freely combined with each other, or each of the above embodiments may be modified or abbreviated as appropriate.

DESCRIPTION OF THE REFERENCE CHARACTERS 1 vehicle AC generator, 2 front bracket, 3 rear bracket, 4 casing, 5 bearing, 6 shaft, 7 pulley, 8 rotor, 9 stator, 10 slip ring, 11 brush, 12 brush holder, 13 capacitor body, 14 circuit component, 15 molded body, 15*a* connector, 16 voltage regulation device, 17 rectification device, 18 cover, 19*a* insert conductor, 19*ae* extended-portion-for-jumper, 19*ac* connector end, 19*b* insert conductor, 19*be* exposed surface, 19*bp* protrusion, 20 cooling plate, 21 resin, 30 molded body, 31*a*, 31*b* insert conductor, 32 series resistor, 32*a* resistor lead, 33 jumper

The invention claimed is:

1. An AC generator comprising:
a stator;
a rotor for inducing AC electromotive force to the stator by being driven to rotate;
a rectification device for converting the AC electromotive force into DC output voltage; and
a voltage regulation device for regulating a magnitude of the DC output voltage, wherein
the voltage regulation device is composed of:
a molded body having a plurality of insert conductors; and
a circuit component mounted to the molded body and electrically connected to the insert conductors, and
an extended-portion-for-jumper is integrally provided in a part of the insert conductors,
wherein the extended-portion-for-jumper is a portion of the insert conductor and has a cantilever structure in which at least one end portion of the extended-portion-for-jumper extends to a position where the one end portion faces another of the insert conductors.

2. The AC generator according to claim 1, wherein
the one end portion of the extended-portion-for-jumper extends so as to overlap an exposed surface of the another insert conductor.

3. The AC generator according to claim 1, wherein
the one end portion of the extended-portion-for-jumper extends so as to overlap the another insert conductor in surface contact therewith.

4. The AC generator according to claim 1, wherein
the extended-portion-for-jumper is provided at a portion that corresponds to a portion where a circuit component is to be connected afterwards to another voltage regulation device that is compatible with the voltage regulation device.

* * * * *